US012675979B2

(12) United States Patent
Wang et al.

(10) Patent No.: US 12,675,979 B2
(45) Date of Patent: Jul. 7, 2026

(54) METHOD, ELECTRONIC DEVICE, AND COMPUTER PROGRAM PRODUCT FOR DATASET UPDATING

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 359 days.

(21) Appl. No.: 18/225,729

(22) Filed: Jul. 25, 2023

(65) Prior Publication Data

US 2025/0037430 A1    Jan. 30, 2025

(51) Int. Cl.
| | |
|---|---|
| *G06V 10/72* | (2022.01) |
| *G06V 10/74* | (2022.01) |
| *G06V 10/774* | (2022.01) |
| *G06V 10/82* | (2022.01) |

(52) U.S. Cl.
CPC ............ *G06V 10/774* (2022.01); *G06V 10/72* (2022.01); *G06V 10/761* (2022.01); *G06V 10/82* (2022.01)

(58) Field of Classification Search
CPC .... G06V 10/774; G06V 10/72; G06V 10/761; G06V 10/82; G06F 18/22
See application file for complete search history.

(56) References Cited

U.S. PATENT DOCUMENTS

| | | | | |
|---|---|---|---|---|
| 2020/0410677 A1* | 12/2020 | Keshwani | ............. | G06F 16/583 |
| 2022/0198516 A1* | 6/2022 | Lu | ........... | G06F 16/483 |
| 2023/0038047 A1* | 2/2023 | Wang | ..................... | G06V 20/00 |
| 2024/0185564 A1* | 6/2024 | Wang | ..................... | G06V 10/82 |

FOREIGN PATENT DOCUMENTS

| | | | | | |
|---|---|---|---|---|---|
| CN | 114692732 A | * | 7/2022 | ....... | G06F 18/23213 |
| CN | 202210799154.6 | | 1/2024 | | |

OTHER PUBLICATIONS

Matsuzaki et al, (Multi-Source Soft Pseudo-Label Learning with Domain Similarity-based Weighting for Semantic Segmentation, 2023, arXiv:2303.00979v1, pp. 1-6. (Year: 2023).*

* cited by examiner

*Primary Examiner* — Kathleen M Broughton
(74) *Attorney, Agent, or Firm* — Krishnendu Gupta; Lesley Leonessa

(57) ABSTRACT

Embodiments of the present disclosure relate to a method, an electronic device, and a computer program product for dataset updating. The method includes: acquiring a reference dataset comprising a plurality of reference images, wherein each reference image has a soft label, and the soft label indicates a probability that the each reference image belongs to each target class in a plurality of target classes. The method may further include: determining, according to a similarity between an input image received and the each reference image, an image soft label for the input image. The method further includes: adding the input image and the image soft label for the input image to the reference dataset to update the reference dataset.

19 Claims, 7 Drawing Sheets

[0,0.82,0,0,0,0,0.03,0.11,0,0.04]

[0,0,0,0,0.07,0,0,0,0.93]

[0,0,0, 0.07,0,0,0,0,0.91,0.02]

[0,0,0,0.97,0,0,0,0,0,0.03]

400

402

Determining a weight for each reference image
according to a similarity between an input image
and the each reference image

404

Determining an image soft label for the input image
according to the soft label for the each reference
image and the corresponding weight

METHOD, ELECTRONIC DEVICE, AND COMPUTER PROGRAM PRODUCT FOR DATASET UPDATING

TECHNICAL FIELD

Embodiments of the present disclosure relate to the field of data processing and, in particular, to a method, an electronic device, and a computer program product for dataset updating.

BACKGROUND

In recent years, few-shot datasets have been used more and more, for example, to train machine learning models. For example, in edge computing, end-users typically can only collect a limited amount of data, and even in such case, the edge device still needs to update a model in the case of limited sample data in the dataset. However, since the bias distribution formed by a machine learning model based on only a small amount of sample data is prone to overfitting, it is challenging to learn from a limited number of samples, and it is also one of the challenging problems in the field of machine learning today.

SUMMARY OF THE INVENTION

A method, an electronic device, and a computer program product for dataset updating are provided in the embodiments of the present disclosure.

According to a first aspect of the present disclosure, a method for dataset updating is provided. The method includes: acquiring a reference dataset comprising a plurality of reference images, wherein each reference image has a soft label, and the soft label indicates a probability that the each reference image belongs to each target class in a plurality of target classes. The method may further include: determining, according to a similarity between an input image received and the each reference image, an image soft label for the input image. The method further includes: adding the input image and the image soft label for the input image to the reference dataset to update the reference dataset.

According to a second aspect of the present disclosure, an electronic device is provided. The electronic device includes at least one processor; and a memory coupled to the at least one processor and having instructions stored thereon, wherein the instructions, when executed by the at least one processor, cause the device to execute actions including: acquiring a reference dataset comprising a plurality of reference images, wherein each reference image has a soft label, and the soft label indicates a probability that the each reference image belongs to each target class in a plurality of target classes; determining, according to a similarity between an input image received and the each reference image, an image soft label for the input image; and adding the input image and the image soft label for the input image to the reference dataset to update the reference dataset.

According to a third aspect of the present disclosure, a computer program product is provided, which is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

The embodiments of the present disclosure will be described in more detail below with reference to the accompanying drawings. Although the drawings show some embodiments of the present disclosure, it should be understood that the present disclosure can be implemented in various forms, and should be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In recent years, few-shot datasets have been used more and more. For example, researchers are exploring various model training methods based on few-shot datasets. Among them, one method is to optimize a gradient descent process to improve the learning efficiency of a model, which, however, needs to improve conventional training methods for supervised learning and also will introduce many learning parameters, whereas another method is to generate more usable sample images by using, for example, a generative adversarial network (GAN), which, however, requires the design of a complex model and loss function to generate more usable sample images.

At least to address these and other potential problems, an embodiment of the present disclosure proposes a method for dataset updating. The method includes: acquiring a reference dataset comprising a plurality of reference images, wherein each reference image has a soft label, and the soft label indicates a probability that the each reference image belongs to each target class in a plurality of target classes. The method may further include: determining, according to a similarity between an input image received and the each reference image, an image soft label for the input image. The method further includes: adding the input image and the image soft label for the input image to the reference dataset to update the reference dataset. The method for dataset updating according to the embodiment of the present disclosure does not need to design a complex model and loss function, which can greatly reduce the computing cost and improve the learning efficiency of the model, and has a wide range of application prospects.

Figure 1:
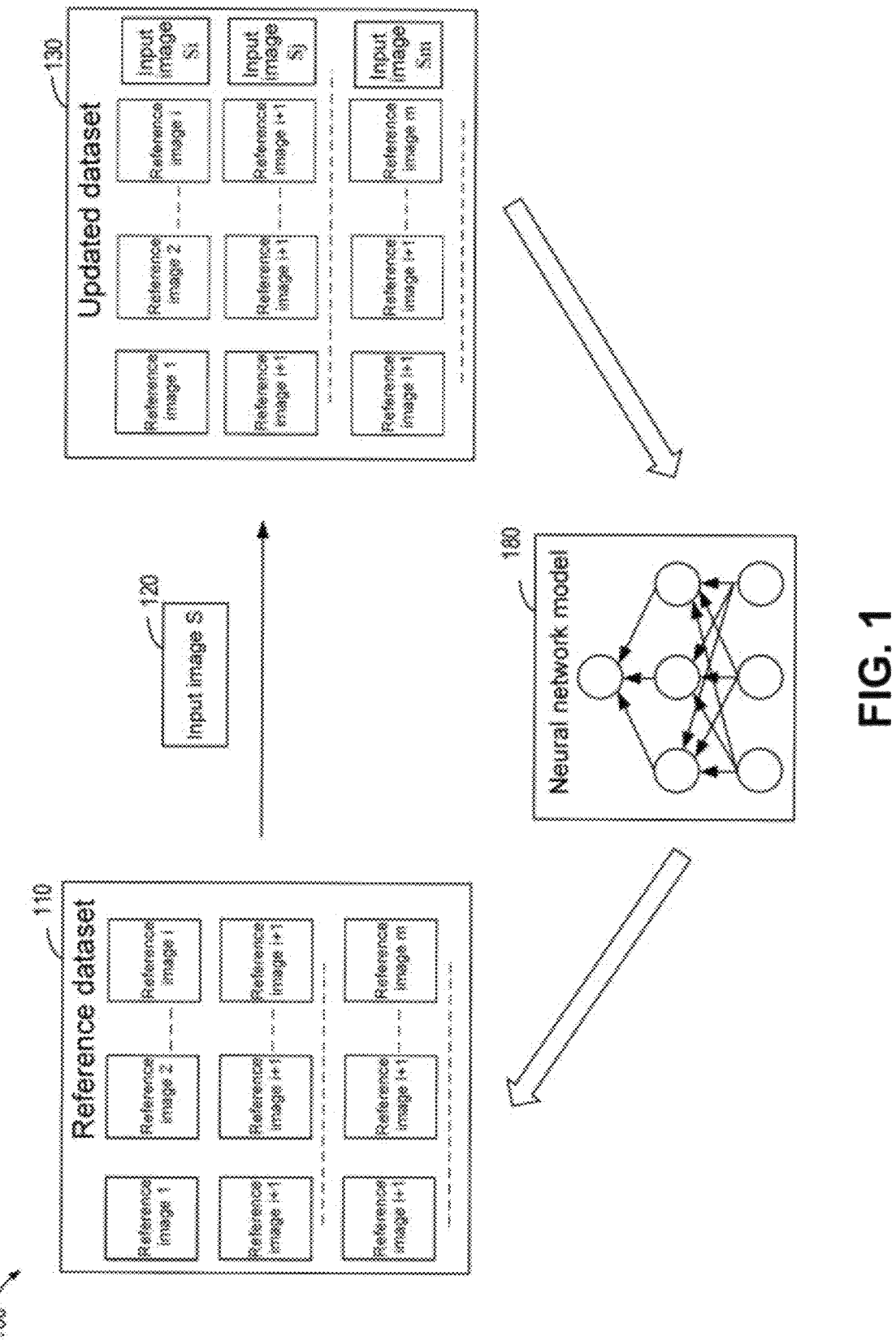
FIG. 1 illustrates a schematic diagram of example environment 100 in which a device and/or a method according to embodiments of the present disclosure can be implemented.

Embodiments of the present disclosure will be further described in detail below with reference to the accompanying drawings. FIG. 1 is a schematic diagram of example environment 100 in which the embodiments of the present disclosure can be implemented.

In example 100 in FIG. 1, reference dataset 110 is shown. Reference dataset 110 may, for example, include a pre-generated dataset. The dataset may be generated by a trained neural network model or may be generated by pre-labeling reference images in the dataset, and the present disclosure does not limit the manner in which the reference dataset is generated. This reference dataset 110 may include a plurality of reference images, such as, for example, reference image 1, reference image 2, . . . , reference image m, and the like, and the present disclosure does not limit the number of reference images in reference dataset 110.

In one embodiment, each reference image in reference dataset 110 has a soft label, and the soft label indicates a probability that the corresponding each reference image belongs to each target class in a plurality of target classes. In one embodiment, reference dataset 110 may include a distilled dataset, and accordingly, each reference image in reference dataset 110 may include a distilled reference image, and each distilled reference image includes a soft label that indicates a probability that the corresponding each distilled reference image belongs to each target class in the plurality of target classes. In another embodiment, reference dataset 110 may include an undistilled dataset, and accordingly, each reference image in reference dataset 110 may include an undistilled reference image, and each reference image includes a soft label that indicates a probability that the corresponding each reference image belongs to each target class in the plurality of target classes.

Example 100, as shown in FIG. 1, may be executed by a computing device (not shown). The computing device includes, but is not limited to, a personal computer, a server computer, a handheld or laptop device, a mobile device (such as a mobile phone, a personal digital assistant (PDA), and a media player), a multi-processor system, a consumer electronic product, a wearable electronic device, a smart home device, a minicomputer, a mainframe computer, an edge computing device, and a distributed computing environment including any of the above systems or devices. The computing device may store the aforementioned reference dataset 110 and may receive input image 120, and the computing device may determine, according to a similarity between the received input image 120 and each reference image i in reference dataset 110, an image soft label for input image 120. Further, the computing device may add input image 120 together with the determined image soft label to reference dataset 110 to obtain updated dataset 130. Thus, based on the soft labels for reference images in reference dataset 110, the computing device may assign a new image soft label to input image 120 and add input image 120 together with its assigned image soft label to reference dataset 110 to obtain updated dataset 130, thereby fully utilizing the inherent characteristics of data in the prior reference dataset to acquire an enhanced dataset. This method can be applied in a variety of scenarios, such as enhancement of few-shot datasets, to improve the accuracy and efficiency of model learning.

Although only one input image 120 is illustrated in FIG. 1, it should be understood by those skilled in the art that a desired number of input images can be received according to the actual application scenario of the dataset, thereby acquiring the desired updated dataset. The present disclosure does not limit the number of input images 120.

In one embodiment, reference image dataset 110 includes a distilled dataset, and the distilled dataset may be generated by neural network model 180. Neural network model 180 may include any known and/or future developed machine learning model, and the present disclosure does not limit the specific structure and architecture of neural network model 180. Preferably, in one embodiment, neural network model 180 may include a capsule neural network model. In addition, in one embodiment, the computing device or another computing device (still not shown) different from that computing device may fine-tune neural network model 180 based on updated dataset 130, thus resulting in more accurate and robust reference images in generated reference dataset 110.

The method for dataset updating according to the embodiment of the present disclosure does not need design a complex model and loss function, which can greatly reduce the computing cost and improve the learning efficiency of the model, and has a wide range of application prospects. Therefore, the method for dataset updating according to the embodiment of the present disclosure can also be deployed in edge devices, so that a dataset can be enhanced with higher security, lower latency, and higher reliability so as to achieve updating of a model at the edge devices, thereby improving the application capability and processing efficiency of the model and greatly increasing the computing power of the edge devices.

A block diagram of example system 100 in which embodiments of the present disclosure can be implemented has been described above with reference to FIG. 1. A flow chart of method 200 for dataset updating according to an embodiment of the present disclosure will be described below with reference to FIG. 2. Method 200 may be executed at the computing device (not shown) described in FIG. 1 and at any suitable computing device.

At block 202, the computing device may acquire reference dataset 110, wherein this reference dataset 110 may include a plurality of reference images, such as, for example, reference image 1, reference image 2, . . . , reference image m, and the like. In addition, each reference image i has a soft label, wherein the soft label indicates a probability that the corresponding each reference image belongs to each target class in a plurality of target classes. In one embodiment, reference dataset 110 may include a distilled dataset, and accordingly, each reference image in reference dataset 110 may include a distilled reference image, and each distilled reference image includes a soft label that indicates a probability that the corresponding each distilled reference image belongs to each target class in the plurality of target classes. In another embodiment, reference dataset 110 may include an undistilled dataset, and accordingly, each reference image in reference dataset 110 may include an undistilled reference image, and each reference image includes a soft label that indicates a probability that the corresponding each reference image belongs to each target class in the plurality of target classes.

FIGS. 3A-3D illustrate, using an example in which reference dataset 110 is a distilled dataset, schematic diagrams of a plurality of distilled reference images with soft labels and their soft labels. The distilled reference image illustrated in FIG. 3A will be taken as an example below for explanation. The distilled reference image illustrated in FIG. 3A has a soft label $L_{soft}$ [0, 0.82, 0, 0, 0, 0, 0.03, 0.11, 0, 0.04] expressed in a probabilistic form, where the values in this soft label, from left to right, correspond to numerical target classes 0-9 in sequence, and this soft label $L_{soft}$ indicates that the probability that the distilled reference image in FIG. 3A belongs to target class 0 is 0, the probability of belonging to target class 1 is 0.82, the probability of belonging to target class 2 is 0, the probability of belonging to target class 3 is 0, the probability of belonging to target class 4 is 0, the probability of belonging to target class 5 is 0, the probability of belonging to target class 6 is 0.03, the probability of belonging to target class 7 is 0.11, the probability of belonging to target class 8 is 0, and the probability of belonging to target class 9 is 0.04. In addition, the sum of the values of elements in the soft label is 1. For example, in the soft label $L_{soft}$, 0.82+0.03+0.11+0.04=1.

Figure 3A:
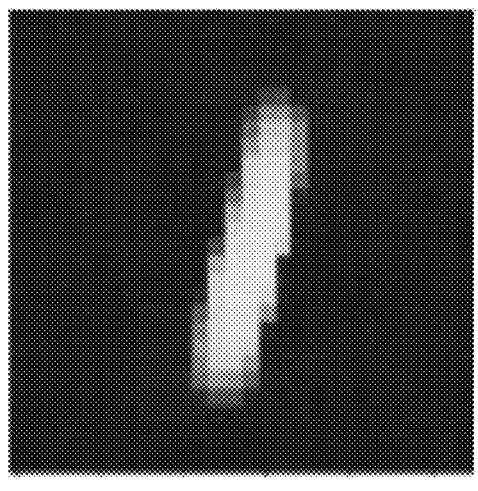
FIGS. 3A-3D illustrate, using an example in which the reference dataset is a distilled dataset, schematic diagrams of a plurality of distilled reference images with soft labels and their soft labels.
Figure 3B:
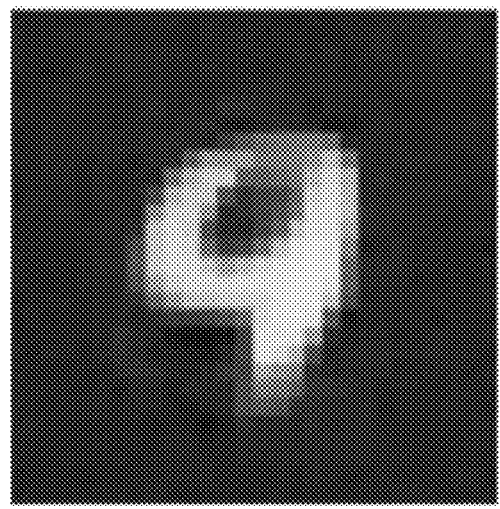
Figure 3C:
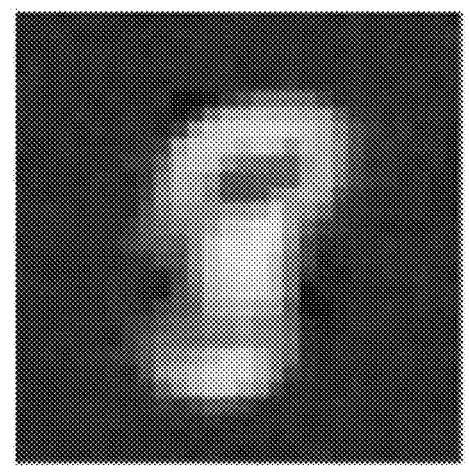
Figure 3D:
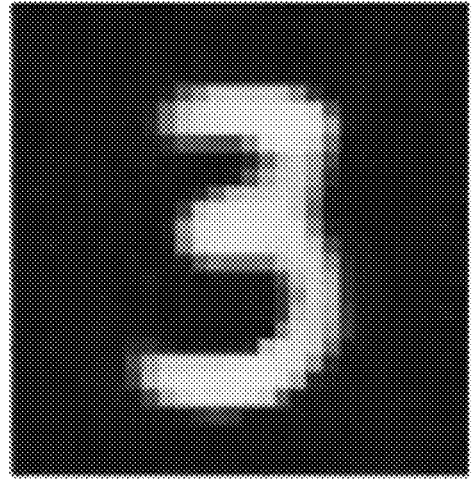

Similarly, the distilled reference images in FIGS. 3B to 3D and the corresponding soft labels $L_{soft}$ may be similar to the description in FIG. 3A and will not be repeated here for brevity. Further, it should be understood by those skilled in the art that although in FIGS. 3A-3D, illustration is provided using numbers as an example and the target classes include numbers 0-9, any target classes and corresponding distilled reference images may be used depending on an actual classification task. The present disclosure does not limit the target classes.

Figure 2:
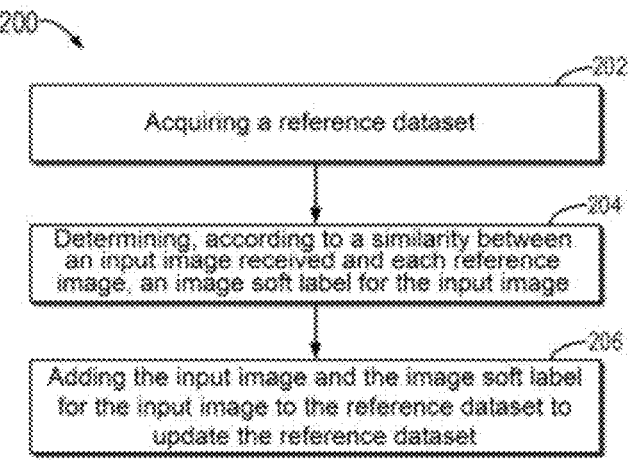
FIG. 2 illustrates a flow chart of method 200 for dataset updating according to an embodiment of the present disclosure.

Still referring to FIG. 2, at block 204, the computing device may determine, according to a similarity between input image 120 received and each reference image, an image soft label $L_{soft, i}$ of input image 120. The specific steps for determining the soft label for input image 120 will be described in detail below. It should be understood that by calculating the similarity between input image 120 and each reference image in reference image set 120, a soft label can be determined for the input image based on the inherent characteristics in the reference images to achieve updating of the dataset and further achieve enhancement of the dataset.

At block 206, the computing device may add input image 120 and determined image soft label $L_{soft, i}$ for the input image to reference dataset 110 to update the reference dataset and obtain updated dataset 130.

Method 200 for dataset updating according to the embodiment of the present disclosure does not need to design a complex model and loss function, which can greatly reduce the computing cost and improve the learning efficiency of the model, and has a wide range of application prospects. Therefore, the method for dataset updating according to the embodiment of the present disclosure can also be deployed in edge devices, so that a dataset can be enhanced with higher security, lower latency, and higher reliability so as to achieve updating of a model at the edge devices, thereby improving the application capability and processing efficiency of the model and greatly increasing the computing power of the edge devices.

Hereinafter, a flow chart of method 400 for determining an image soft label for an input image according to an embodiment of the present disclosure will be described in conjunction with FIG. 4. Method 400 may be executed at the computing device (not shown) described in FIG. 1 and at any suitable computing device.

Figure 4:
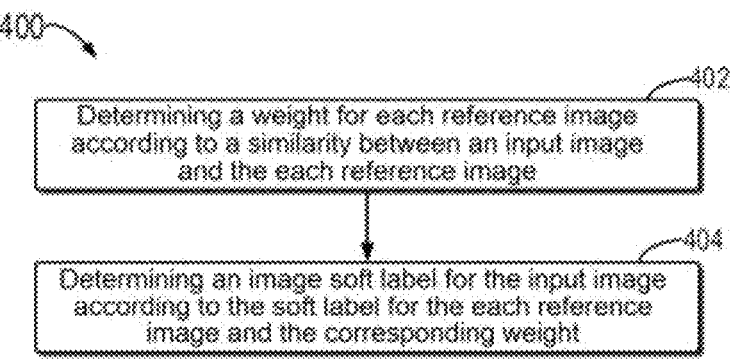
FIG. 4 illustrates a schematic diagram of method 400 for determining a soft label for an input image according to an embodiment of the present disclosure.

As shown in FIG. 4, at block 402, the computing device determines a weight w for each reference image according to the similarity between input image 120 and the each reference image in reference dataset 110.

For example, illustration is provided using an example in which input image 120 is image i, where the weight $w_{i,j}$ for each reference image j may be shown in Equation 1 as follows:

$$w_{i,j} = \frac{sim < i, j >}{\sum_{p \in P} sim < i, p >} \qquad \text{(Equation 1)}$$

where P denotes the reference dataset, sim< . . . , . . . > denotes the similarity between two images, and in this example, cosine similarity is used for calculation. It can be understood by those skilled in the art that other similarity calculation methods may be used, which is not limited in the present disclosure.

After determining the weight $w_{i,j}$ for each reference image j, as shown in block 404 in FIG. 4, the computing device may determine the image soft label $L_{soft,i}$ for input image i according to the soft label $L_{soft,j}$ for each reference image j and the calculated weight $w_{i,j}$.

Specifically, the computing device may weight the soft label $L_{soft,j}$ for the corresponding each reference image j using the weight $w_{i,j}$ so as to obtain a weighted soft label $L_{soft,wj}$ for the each reference image j. Afterwards, the computing device may sum probabilities for corresponding target classes among a plurality (e.g., all) of weighted soft labels $L_{soft,wj}$ to determine the image soft label $L_{soft,i}$ for input image i.

The above steps can be embodied in Equation 2 as follows:

$$L_{soft,i} = \sum_{p \in P} w_{i,p} \times L_{soft,p} \qquad \text{(Equation 2)}$$

For example, illustration is provided using an example in which the reference dataset includes three reference images, and each reference image has corresponding soft labels corresponding to three target classes. For example, the reference dataset includes: first reference image A1, first reference image A1 having a soft label $L_{soft,1}$=[0.3, 0.5, 0.2]; second reference image A2, first reference image A2 having a soft label $L_{soft,2}$=[0.6, 0.1, 0.3]; and third reference image A3, first reference image A3 having a soft label $L_{soft,3}$=[0.4, 0.2, 0.4]. Assuming that the weight for each reference image $A_k$ has been obtained according to the above Equation 1, that is, the reference weight for first reference image A1 is $w_1$=0.3; the reference weight for second reference image A2 is $w_2$=0.4, and the reference weight for third reference image A3 is $w_3$=0.3. Thus, the soft label $L_{soft,k}$ for the corresponding each reference image $A_k$ can be weighted, and the probabilities for corresponding target classes among three weighted soft labels $L_{soft,wk}$ can be summed to determine the image soft label $L_{soft,i}$ for input image i.

That is, in the above example, the weighted soft label corresponding to first image A1 is $L_{soft,w1}$=0.3×[0.3, 0.5, 0.2]=[0.09, 0.15, 0.06]; the weighted soft label corresponding to second image A2 is $L_{soft,w2}=0.4\times[0.6, 0.1, 0.3]=[0.24, 0.04, 0.12]$; and the weighted soft label corresponding to third image A3 is $L_{soft,w3}=0.3\times[0.4, 0.2, 0.4]=[0.12, 0.06, 0.12]$. Accordingly, the image soft label for the input image is $L_{soft,i}=[0.09+0.24+0.12, 0.15+0.04+0.06, 0.06+0.12+0.12]=[0.45, 0.25, 0.3]$.

Through the above description, the process of determining the image soft label $L_{soft,i}$ for input image i has been described. After the image soft label $L_{soft,i}$ for input image i has been determined, input image i and its corresponding image soft label $L_{soft,i}$ may be added together to the reference dataset, thus realizing the updating of the dataset and, specifically, the enhancement of the dataset.

In one embodiment, reference dataset 110 includes a distilled dataset, the distilled dataset including a plurality of distilled reference images obtained after a distillation operation on an original dataset, with a soft label for each distilled reference image indicating a probability that the corresponding each reference image belongs to each target class in the plurality of target classes, and the soft label for each distilled reference image being obtained based on a probability that each original image in the original dataset belongs to each target class in the plurality of target classes.

In one embodiment, where reference dataset 110 includes a distilled dataset, the distilled dataset may be generated based on a neural network model (e.g., neural network model 180 in FIG. 1). In one embodiment, this neural network model 180 may include a capsule neural network model. Specifically, in one embodiment, when generating the distilled dataset, the computing device may acquire an original dataset, wherein the original dataset includes a plurality of original images. The computing device may further perform distillation processing on this original dataset using the capsule neural network model (e.g., neural network model 180 in FIG. 1) to acquire the distilled dataset. Here, each distilled reference image has a corresponding soft label, and this corresponding soft label indicates a probability that the corresponding distilled reference image belongs to each target class in the plurality of target classes.

For example, illustration is still provided in conjunction with FIGS. 3A-3D. FIGS. 3A-3D illustrate, using an example in which reference dataset 110 is a distilled dataset, schematic diagrams of a plurality of distilled reference images with soft labels and their soft labels. The distilled reference image illustrated in FIG. 3A has a soft label $L_{soft}$ [0, 0.82, 0, 0, 0, 0, 0, 0, 0.03, 0.11, 0, 0.04] expressed in a probabilistic form, where the values in this soft label, from left to right, correspond to numerical classes 0-9 in sequence, and this soft label $L_{soft}$ indicates that the probability that the distilled reference image in FIG. 3A belongs to the target class 0 is 0, the probability of belonging to target class 1 is 0.82, the probability of belonging to target class 2 is 0, the probability of belonging to target class 3 is 0, the probability of belonging to target class 4 is 0, the probability of belonging to target class 5 is 0, the probability of belonging to target class 6 is 0.03, the probability of belonging to target class 7 is 0.11, the probability of belonging to target class 8 is 0, and the probability of belonging to target class 9 is 0.04. In addition, the sum of the values of elements in the soft label is 1. For example, in the soft label $L_{soft}$, 0.82+0.03+0.11+0.04=1.

Similarly, the distilled reference images in FIGS. 3B to 3D and the corresponding soft labels $L_{soft,i}$ may be similar to the description in FIG. 3A and will not be repeated here for brevity. Further, it should be understood by those skilled in the art that although in FIGS. 3A-3D, illustration is provided using numbers as an example and the target classes include numbers 0-9, any target classes and corresponding distilled reference images may be used depending on an actual classification task. The present disclosure does not limit the target classes.

In one embodiment, after receiving a desired number of input images, the computing device may complete updating of the reference dataset. In addition, in this updated dataset, each image may have a corresponding soft label and hard label. Further, this updated dataset may be used by this computing device or another computing device different from this computing device to fine-tune neural network model 180 that generates the above distilled dataset. During the fine-tuning, there may be no limitation to the type of label used by the training data. For example, when the computing device performing the fine-tuning detects that the currently input sample image has a hard label, the computing device may set the loss function for the neural network model to be a loss function of a first type, e.g., an argmax function; and when the computing device performing the fine-tuning detects that the currently input sample image has a soft label, the computing device may set the loss function for the neural network model to be a loss function of a second type, e.g., a difference between the mutual information between original dataset X and distilled dataset Z and the similarity between original dataset X and distilled dataset Z, i.e., $\mathbb{L}=L_{or}(Z)-I(X,Z)$, where Lor(Z) denotes the similarity between the original dataset and the distilled dataset, and I(X,Z) denotes the mutual information between the original dataset and the distilled dataset. This loss function will be described below.

Figure 5:
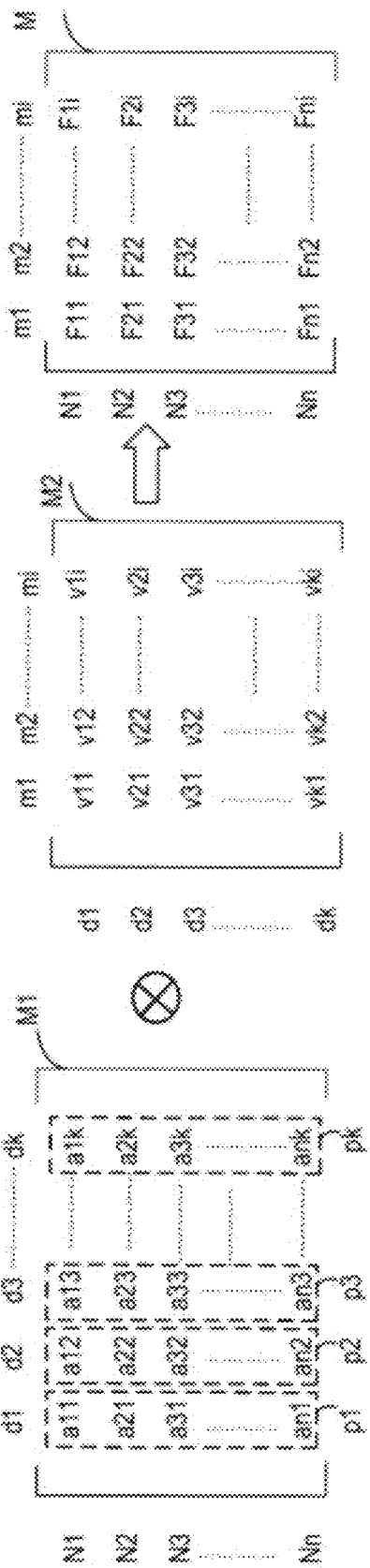
FIG. 5 illustrates a schematic flow chart for determining a soft label according to an embodiment of the present disclosure.

Hereinafter, the generation of distilled images in the distilled dataset and the method for determining a soft label for each distilled image will be described in conjunction with FIG. 5. FIG. 5 illustrates a schematic block diagram for generating a corresponding soft label for each distilled reference image.

The distilled reference images according to embodiments of the present disclosure may be generated using a capsule neural network model. The capsule neural network model is a network structure with superior performance in the field of machine learning. In the dynamic routing of the capsule neural network, the entropy of weights is very low. The embodiments of the present disclosure fully exploit this property of the capsule neural network, and calculate the soft label for each distilled image in the distilled dataset by directly using output features in the dynamic routing of the capsule neural network model, whereby the computational cost can be greatly reduced, and the computing power and efficiency can be improved. The process of determining the soft label for a distilled image will be described in detail below in conjunction with FIG. 5.

When acquiring the distilled dataset, the computing device may input each original image in the original dataset into the capsule neural network model (e.g., capsule neural network model 180 in FIG. 1) and obtain a set of output features (e.g., matrix M1 shown in FIG. 5). The computing device may acquire a set of capsule features of the capsule neural network (e.g., matrix M2 shown in FIG. 5), and the computing device may acquire the distilled dataset based on the set of output features and the set of capsule features. For example, the computing device may acquire a set of intermediate features based on the set of output features and the set of capsule features, and the set of intermediate features is further processed by a fully connected layer in the capsule neural network model to obtain the final distilled image output.

In one embodiment, the computing device, when inputting each original image in the original dataset to the capsule neural network model, may acquire the output of a higher layer of capsules (e.g., a first capsule layer) in the capsule neural network model and use the output as the set of output features. As shown in FIG. 5, in one embodiment, the set of output features may include output feature matrix M1, the number of rows of output feature matrix M1 corresponds to the number n of original images in the original dataset, and the number of columns of output feature matrix M1 corresponds to the number k of capsules in the capsule neural network model. In addition, each row in output feature matrix M1 denotes image features of original image Nj corresponding to that row, and each element in that row may denote the output probability (e.g., obtained by normalizing the image features for each row) of original image Nj corresponding to that row for each capsule. For example, as shown in FIG. 5, for original image N1 corresponding to the first row, the elements (a11, a12, a13, . . . , a1$k$) in this first row denote the image features of original image N1, and each element a1$j$ ($1 \leq j \leq k$ and j is a positive integer) denotes the output probability of this original image N1 for corresponding capsule dj in the capsule neural network model.

The set of capsule features is further illustrated in FIG. 5. For example, in one embodiment, the set of capsule features may be represented as matrix M2, wherein the number of rows of the matrix corresponds to the number of capsules in the capsule neural network model, and the number of columns of the matrix corresponds to i, indicating that each capsule has an i-dimensional vector. For example, as described in FIG. 5, for the first row, the vector of the first capsule in the capsule neural network model is (v11, v12, . . . , v1$i$). In one embodiment, this matrix M2 may be obtained through learning.

The computing device may perform an operation of multiplication on output feature matrix M1 and capsule feature matrix M to obtain feature matrix M, which characterizes the intermediate features of the original images, and this feature matrix M may further be processed through the fully connected layer in the capsule neural network model which may output the distilled images.

As shown in FIG. 5, for output feature matrix M1, the column vector pj of each feature matrix M1 may denote the output probability (e.g., obtained, for example, by normalizing the image features for each row) of each original image in the original dataset at that corresponding capsule di. Since capsules correspond to target classes, it may be understood that an element in a column vector of each output feature matrix M1 denotes the probability that each original image in the original dataset belongs to that corresponding class. For example, taking the first column in output feature matrix M1 as an example, element a11 may denote the output probability that the first original image belongs to the first target class (corresponding to capsule d1), element a21 may denote the output probability that the second original image belongs to the first target class (corresponding to capsule d1), and by analogy, element an1 may denote the output probability that the nth original image belongs to the first target class (corresponding to capsule d1). For the sake of brevity, elements in other columns Pi in output feature matrix M1 will not be described one by one.

According to the column vectors in output feature matrix M1, a soft label for each distilled reference image can be acquired. Specifically, in one embodiment, the computing device may acquire a column vector in output feature matrix M1 that corresponds to the corresponding target class. For example, the computing device may acquire column vector pj in output feature matrix M1 that corresponds to target class Cj (corresponding to capsule dj, $1 \leq j \leq k$, and j is a positive integer), wherein each element in column vector pj denotes the output probability that each original image belongs to that target class. For example, the output probability may be expressed as (a1$j$, a2$j$, a3$j$, . . . , anj). The computing device may determine a probability value (a1$j$, a2$j$, a3$j$, . . . , anj) corresponding to each distilled image based on the elements in column vector pj. For example, the computing device may first determine which distilled image each original image in the original image belongs to, and may then determine the probability value corresponding to the each distilled image. The computing device may further determine, based on the probability value corresponding to the each distilled image, a probability that the each distilled image is under corresponding target class dj as a soft label for the distilled image.

Specifically, in one embodiment, the computing device may determine the distilled image corresponding to each probability value in column vector pj. In an illustrative example, illustration is provided taking an example in which L distilled reference images are generated using n original images, wherein column vector pj is acquired for the jth target class, and based on this column vector pj, the probability value corresponding to each distilled reference image can be determined. For example, assuming that first distilled reference image I1 corresponds to probability a1$j$, second distilled reference image I 2 corresponds to probability a2$j$, third distilled reference image I 3 corresponds to probability a3$j$, and by analogy, the Lth distilled reference image IL corresponds to probability aLj. It should be understood that the above assumptions are for illustrative purposes and are merely schematic.

The computing device may determine the number of original images corresponding to each probability value in the column vector based on the determined number of original images corresponding to the distilled reference image. Still using the above example, assuming that first distilled reference image I1 corresponds to n1 original images, second distilled reference image I2 corresponds to n2 original images, third distilled reference image I3 corresponds to n3 original images, and by analogy, the Lth distilled reference image IL corresponds to nL original images, and n1+n2+n3+ . . . +nL=n. Thus, the probability that each distilled reference image is under the corresponding target class can be determined based on each probability value and the number of original images corresponding to each probability value.

For example, using the above example, for each distilled image z, the probability that it is under the jth target class can be calculated by Equation 3 as follows:

$$Pro_{zj} = nz \times azj / n1 \times a1j + n2 \times a2j + n3 \times a3j \ldots + nL \times aLj \quad \text{(Equation 3)}$$

where $Pro_{zj}$ is the probability that each distilled reference image z is under the jth target class, and azj is the corresponding probability value of corresponding distilled reference image z in that column vector. In addition, $1 \leq z \leq L$, and z is a positive integer.

The computing device may perform calculation for each target class, determine corresponding probability value $Pro_{zj}$ for each distilled reference image, and combine the determined probability values to form the soft label [$Pro_{z1}$, $Pro_{z2}$, . . . , $Pro_{zk}$] corresponding to each distilled reference image, where k is the number of target classes.

In addition, to improve the computing efficiency, the computing device may also select, from the selected column vector, probability values greater than a probability threshold, determine, from the selected probability values, the number of original images corresponding to each distilled reference image corresponding to each probability value, and determine, based on each probability value and the number of original images corresponding to each probability value, the probability that each distilled reference image is under the corresponding target class. For the specific determination process, reference may be made to the above description, which is not repeated here for the sake of brevity.

In one embodiment, the above distilled dataset may be acquired by using a capsule neural network model. During the training of this capsule neural network, its loss function is related to a difference of the following parameters: mutual information between the original dataset and the distilled dataset; and a similarity between the original dataset and the distilled dataset.

In one embodiment, the mutual information between original dataset X and distilled dataset Z may be expressed as the following Equation 4:

$$I(X, Z) = \int \int p(z|x)\hat{p}(x)\log\frac{p(z|x)}{p(z)}dxdz \qquad \text{(Equation 4)}$$

where $p(z)=\int p(z|x)\hat{p}(x)dx$.

In addition, the similarity between the original dataset and the distilled dataset may be expressed as the following Equation 5:

$$L_{or} = \sum_{i,j \in Z} \langle i, j \rangle \qquad \text{(Equation 5)}$$

where $\langle i,j \rangle$ denotes the similarity between each pair of corresponding images in the two datasets.

Thus, the loss function for training the capsule neural network model may be expressed as follows:

$$\mathbb{L} = L_{or}(Z) - I(X, Z) \qquad \text{(Equation 6)}$$

In addition, as described above, when the updated dataset is used for fine-tuning the capsule network, the loss function defined in Equation 6 may also be used for fine-tuning.

The method for dataset updating according to the embodiment of the present disclosure does not need to design a complex model and loss function, which can greatly reduce the computing cost and improve the learning efficiency of the model, and has a wide range of application prospects. Therefore, the method for dataset updating according to the embodiment of the present disclosure can also be deployed in edge devices, so that a dataset can be enhanced with higher security, lower latency, and higher reliability so as to achieve updating of a model at the edge devices, thereby improving the application capability and processing efficiency of the model and greatly increasing the computing power of the edge devices.

Figure 6:
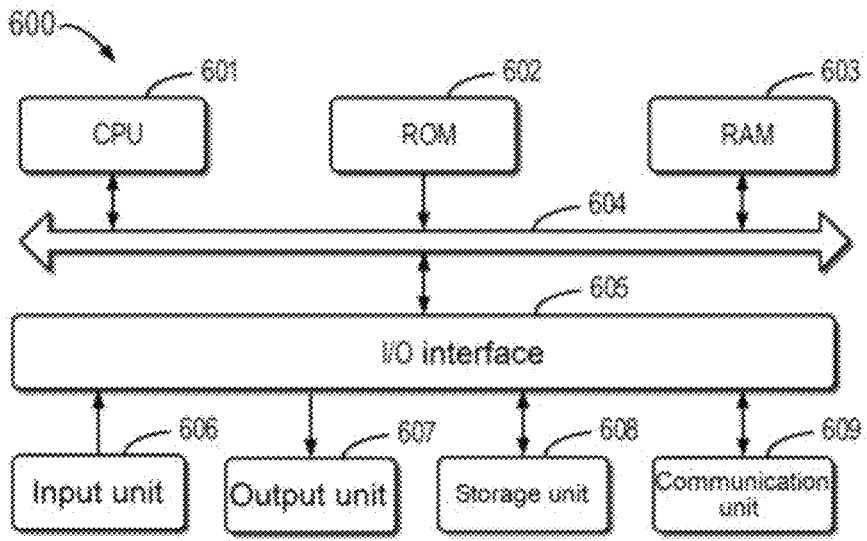
FIG. 6 illustrates a schematic block diagram of example device 600 that is suitable for implementing embodiments of the content of the present disclosure.

FIG. 6 illustrates a schematic block diagram of example device 600 that may be used to implement embodiments of the present disclosure. Computing devices for executing the method according to the embodiments of the present disclosure may be implemented using device 600. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for the operation of device 500 may further be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage page 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200 for dataset updating and the related processes (e.g., process 400), may be performed by processing unit 601. For example, in some embodiments, method 200 for dataset updating and the related processes (e.g., process 400) may be implemented as a computer software program that is tangibly contained in a machine-readable medium, such as storage unit 608. In some embodiments, part of or all the computer program may be loaded and/or installed onto device 600 via ROM 602 and/or communication unit 609. When the computer program is loaded into RAM 603 and executed by CPU 601, one or more actions of method 200 for dataset updating and the related processes (e.g., process 400) described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

What is claimed is:

1. A method for dataset updating, comprising:

acquiring a reference dataset comprising a plurality of reference images, wherein each reference image has a soft label, and the soft label indicates a probability that the each reference image belongs to each target class in a plurality of target classes;

determining, according to a similarity between an input image received and the each reference image, an image soft label for the input image, determining a number of original images corresponding to a distilled reference image corresponding to each probability value and determining, based on the each probability value and the number of the original images corresponding to the each probability value, a probability that the each distilled reference image is under a corresponding target class; and adding the input image and the image soft label for the input image to the reference dataset to update the reference dataset.

2. The method according to claim 1, wherein determining, according to a similarity between an input image received and the each reference image, an image soft label for the input image comprises:

determining a weight for the each reference image according to the similarity between the input image and the each reference image; and determining the image soft label for the input image according to the soft label for the each reference image and the weight.

3. The method according to claim 2, wherein determining the image soft label for the input image according to the soft label for the each reference image and the weight comprises:

weighting the soft label for the each reference image using the weight to obtain a weighted soft label for the each reference image; and summing probabilities for corresponding target classes among a plurality of the weighted soft labels to determine the image soft label for the input image.

4. The method according to claim 1, wherein the reference dataset comprises a distilled dataset, the distilled dataset comprising a plurality of distilled reference images obtained after a distillation operation on an original dataset, with a soft label for each distilled reference image being obtained based on a probability that each original image in the original dataset belongs to each target class in the plurality of target classes.

5. The method according to claim 4, further comprising:

acquiring the original dataset, wherein the original dataset comprises a plurality of original images;

performing the distillation processing on the original dataset using a capsule neural network model to acquire the distilled dataset, wherein the soft label indicates a probability that the corresponding distilled reference image belongs to the each target class in the plurality of target classes.

6. The method according to claim 5, wherein the input image further comprises a corresponding image hard label, the method further comprising:

fine-tuning the capsule neural network model based on the image soft label and/or the image hard label for the input image.

7. The method according to claim 5, wherein performing the distillation processing on the original dataset to acquire the distilled dataset comprises:

inputting each original image in the original dataset to the capsule neural network model and acquiring a set of output features;

acquiring a set of capsule features of the capsule neural network model; and acquiring the distilled dataset based on the set of output features and the set of capsule features.

8. The method according to claim 7, wherein the set of output features comprises an output feature matrix, and wherein an element in a column vector of the output feature matrix indicates a probability that each original image in the original dataset belongs to a corresponding target class in the plurality of target classes.

9. The method according to claim 8, wherein performing the distillation processing on the original dataset to acquire the distilled dataset comprises:

acquiring a column vector in the output feature matrix that corresponds to the corresponding target class;

determining a probability value corresponding to each distilled reference image based on elements in the column vector;

determining, based on the probability value corresponding to the each distilled reference image, a probability that the each distilled reference image is under the corresponding target class as a soft label for the distilled reference image.

10. The method according to claim 5, further comprising:

training the capsule neural network model based on the original dataset, wherein the loss function for training the capsule neural network model is related to a difference of the following parameters:

mutual information between the original dataset and the distilled dataset; and a similarity between the original dataset and the distilled dataset.

11. An electronic device for dataset updating, the electronic device comprising:

at least one processor; and a memory coupled to the at least one processor and having instructions stored thereon, wherein the instructions, when executed by the at least one processor, cause the electronic device to perform actions comprising:

acquiring a reference dataset comprising a plurality of reference images, wherein each reference image has a soft label, and the soft label indicates a probability that the each reference image belongs to each target class in a plurality of target classes;

determining, according to a similarity between an input image received and the each reference image, an image soft label for the input image, determining a number of original images corresponding to a distilled reference image corresponding to each probability value and determining, based on the each probability value and the number of the original images corresponding to the each probability value, a probability that the each distilled reference image is under a corresponding target class; and adding the input image and the image soft label for the input image to the reference dataset to update the reference dataset.

12. The electronic device according to claim 11, wherein determining, according to a similarity between an input image received and the each reference image, an image soft label for the input image comprises:

determining a weight for the each reference image according to the similarity between the input image and the each reference image; and determining the image soft label for the input image according to the soft label for the each reference image and the weight.

13. The electronic device according to claim 12, wherein determining the image soft label for the input image according to the soft label for the each reference image and the weight comprises:

weighting the soft label for the each reference image using the weight to obtain a weighted soft label for the each reference image; and summing probabilities for corresponding target classes among a plurality of the weighted soft labels to determine the image soft label for the input image.

14. The electronic device according to claim 11, wherein the reference dataset comprises a distilled dataset, the distilled dataset comprising a plurality of distilled reference images obtained after a distillation operation on an original dataset, with a soft label for each distilled reference image being obtained based on a probability that each original image in the original dataset belongs to each target class in the plurality of target classes.

15. The electronic device according to claim 14, wherein the instructions, when executed by the at least one processor, cause the electronic device to perform the following:

acquiring the original dataset, wherein the original dataset comprises a plurality of original images;

performing the distillation processing on the original dataset using a capsule neural network model to acquire the distilled dataset, wherein the soft label indicates a probability that the corresponding distilled reference image belongs to the each target class in the plurality of target classes.

16. The electronic device according to claim 15, wherein the input image further comprises a corresponding image hard label, and the instructions, when executed by the at least one processor, cause the electronic device to perform the following:

fine-tuning the capsule neural network model based on the image soft label and/or the image hard label for the input image.

17. The electronic device according to claim 15, wherein performing the distillation processing on the original dataset to acquire the distilled dataset comprises:

inputting each original image in the original dataset to the capsule neural network model and acquiring a set of output features;

acquiring a set of capsule features of the capsule neural network model; and acquiring the distilled dataset based on the set of output features and the set of capsule features.

18. The electronic device according to claim 17, wherein the set of output features comprises an output feature matrix, and wherein an element in a column vector of the output feature matrix indicates a probability that each original image in the original dataset belongs to a corresponding target class in the plurality of target classes.

19. A non-transitory machine-readable storage medium containing instructions, wherein the instructions, when executed, cause a processor to perform operations to:

acquire a reference dataset comprising a plurality of reference images, wherein each reference image has a soft label, and the soft label indicates a probability that the each reference image belongs to each target class in a plurality of target classes;

determine, according to a similarity between an input image received and the each reference image, an image soft label for the input image, determining a number of original images corresponding to a distilled reference image corresponding to each probability value and determining, based on the each probability value and the number of the original images corresponding to the each probability value, a probability that the each distilled reference image is under a corresponding target class; and add the input image and the image soft label for the input image to the reference dataset to update the reference dataset.

* * * * *